United States Patent
Davis et al.

(10) Patent No.: US 9,739,005 B2
(45) Date of Patent: Aug. 22, 2017

(54) METHODS FOR MONITORING LOAD BALANCE IN WASHING MACHINE APPLIANCES

(71) Applicant: General Electric Company, Schenectady, NY (US)

(72) Inventors: Paul Owen Davis, Prospect, KY (US); Martin Ortega Brena, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 250 days.

(21) Appl. No.: 14/723,502

(22) Filed: May 28, 2015

(65) Prior Publication Data

US 2016/0348294 A1 Dec. 1, 2016

(51) Int. Cl.
*D06F 33/02* (2006.01)
*D06F 37/36* (2006.01)
*G01M 1/16* (2006.01)
*D06F 37/20* (2006.01)
*G01M 99/00* (2011.01)

(52) U.S. Cl.
CPC ............ *D06F 37/203* (2013.01); *D06F 33/02* (2013.01); *D06F 37/36* (2013.01); *G01M 1/16* (2013.01); *G01M 99/005* (2013.01); *D06F 2202/10* (2013.01); *D06F 2204/065* (2013.01); *D06F 2222/00* (2013.01)

(58) Field of Classification Search
CPC ........ D06F 37/203; D06F 33/02; D06F 37/36; D06F 2222/00; D06F 2202/10; D06F 2204/065; G01M 99/005; G01M 1/16

USPC .......................................................... 73/457
See application file for complete search history.

(56) References Cited

U.S. PATENT DOCUMENTS

| 6,047,428 | A | 4/2000 | Min |
| 6,282,965 | B1 | 9/2001 | French et al. |
| 7,471,054 | B2 * | 12/2008 | Marioni .................. D06F 33/02 318/268 |
| 8,042,211 | B2 * | 10/2011 | Stansel .................. D06F 37/203 68/12.06 |
| 8,387,190 | B2 | 3/2013 | Stansel et al. |
| 8,932,369 | B2 * | 1/2015 | Miller .................... D06F 35/007 68/12.02 |
| 9,428,854 | B2 * | 8/2016 | Dunn .................... D06F 35/007 |
| 2006/0130242 | A1 * | 6/2006 | Hoppe .................... D06F 33/02 8/158 |
| 2008/0178398 | A1 * | 7/2008 | Darby .................... D06F 37/145 8/159 |
| 2010/0154131 | A1 * | 6/2010 | Paul ...................... D06F 39/003 8/159 |

* cited by examiner

*Primary Examiner* — J M Saint Surin
(74) *Attorney, Agent, or Firm* — Dority & Manning, P.A.

(57) ABSTRACT

Methods for monitoring load balance in washing machine appliances, and washing machine appliances, are provided. A method includes accelerating rotation of a basket about a central axis within a tub of the washing machine appliance from a first speed to a second speed greater than the first speed. The method further includes detecting a plurality of speed changes during the accelerating step, and summing absolute values of speed differences for each of the plurality of detected speed changes to obtain an unfolded speed value.

18 Claims, 4 Drawing Sheets

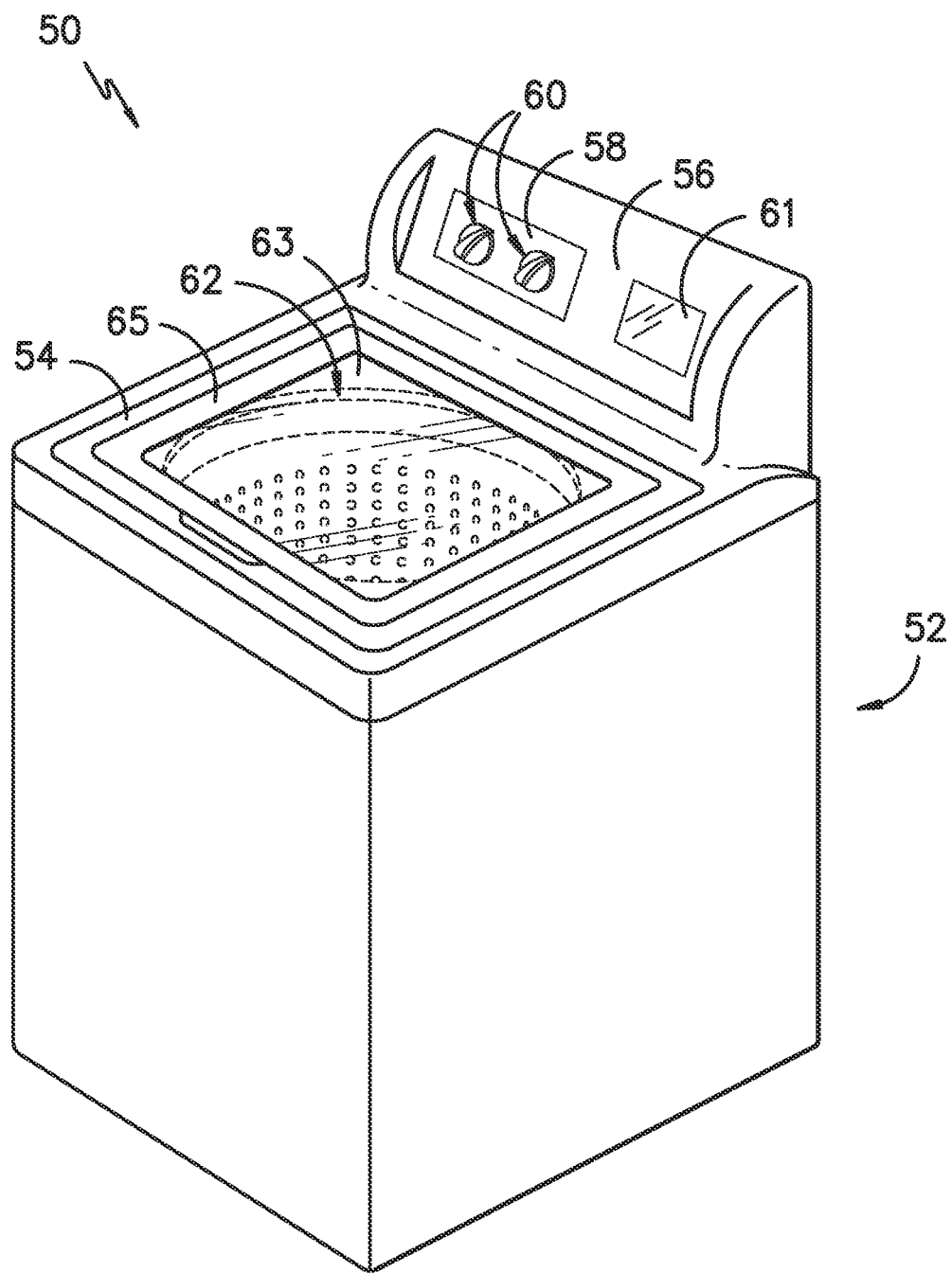
FIG. -1-

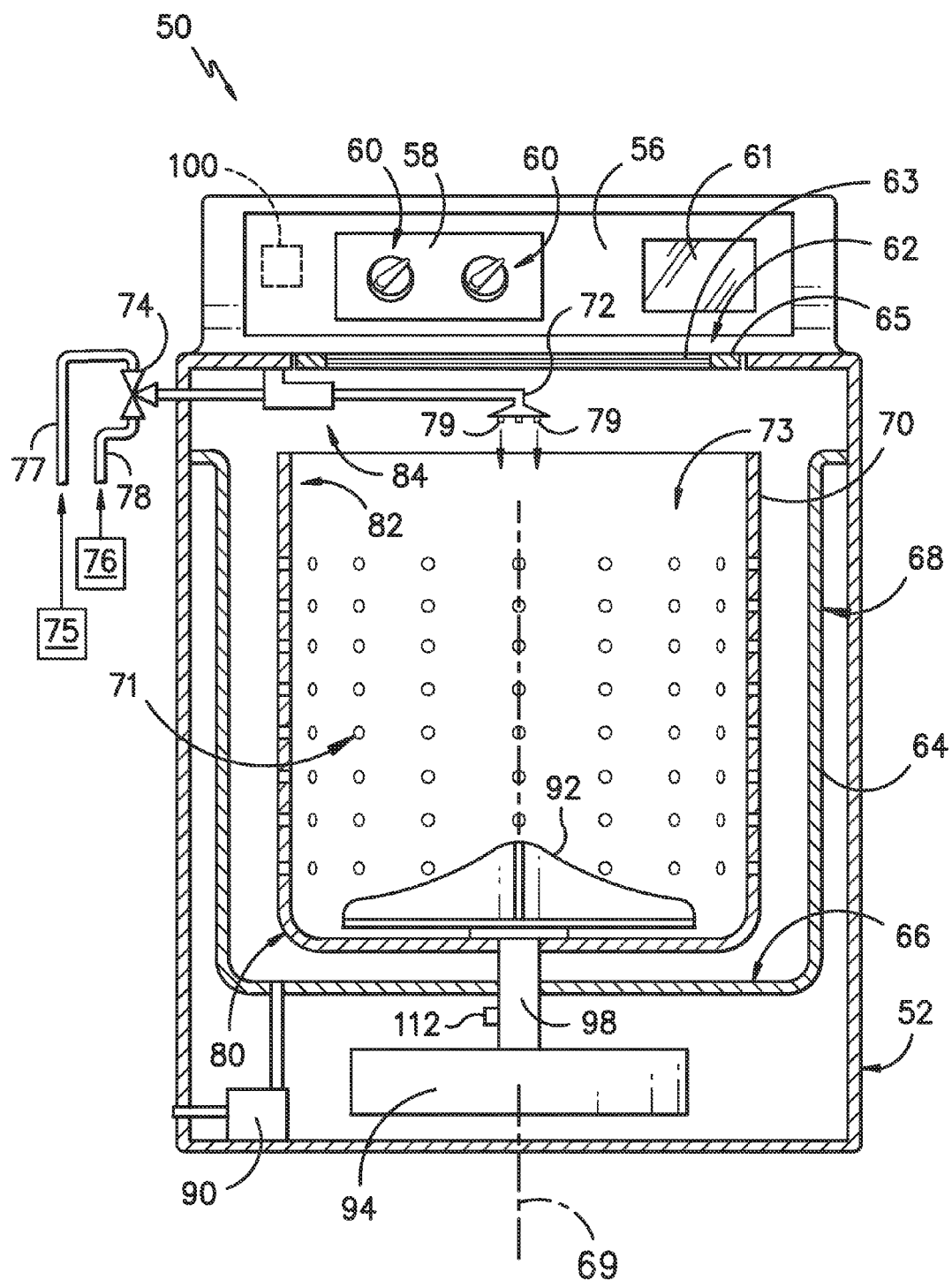
FIG. -2-

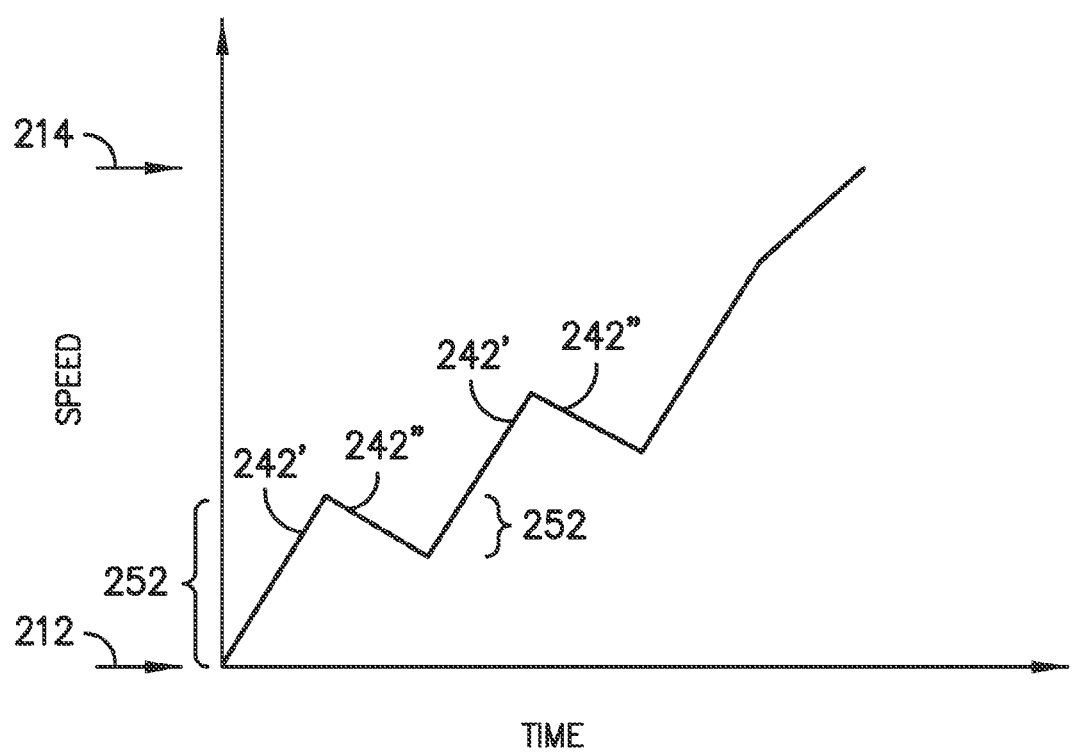
FIG. -3-

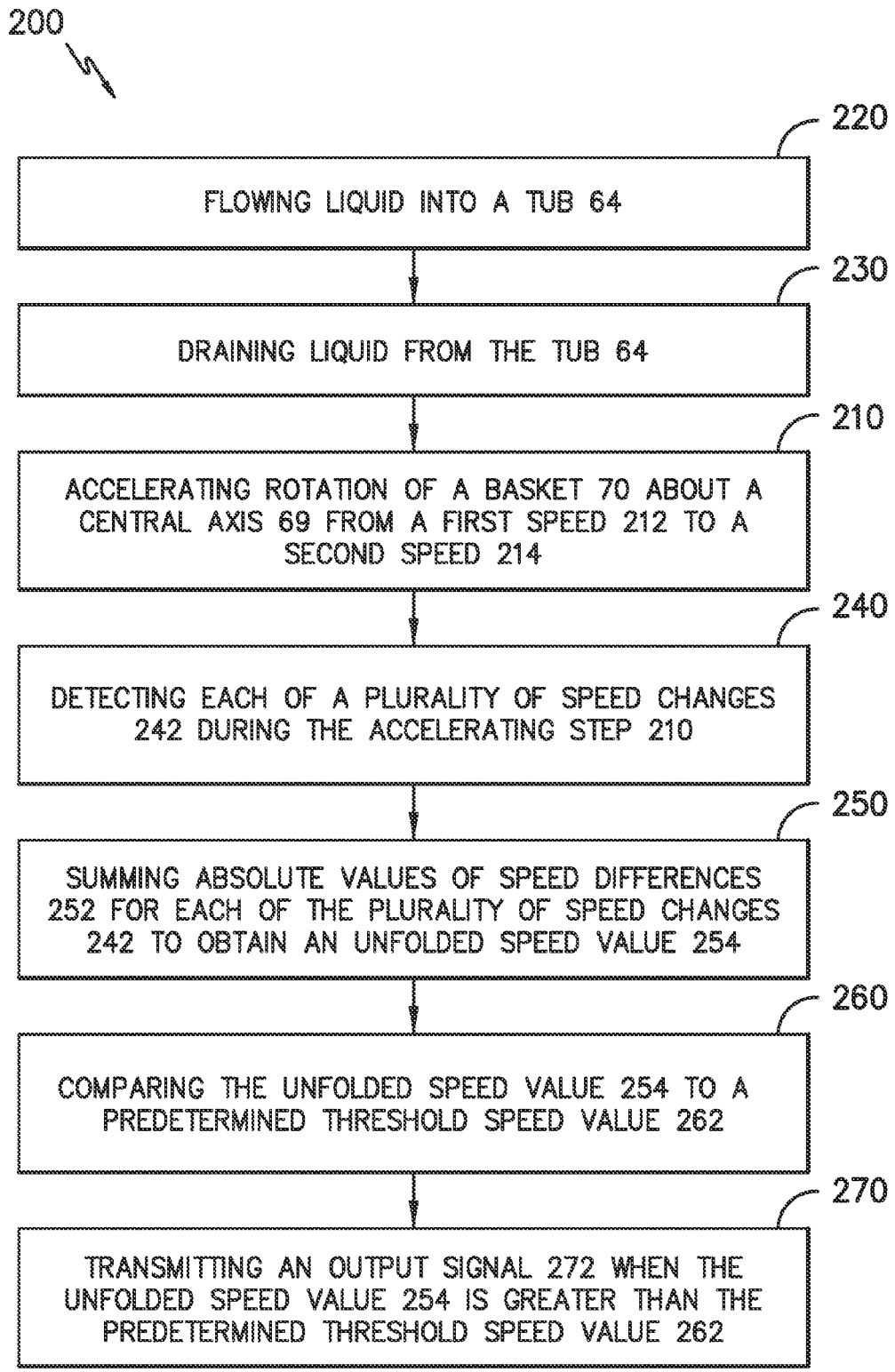
FIG. -4-

METHODS FOR MONITORING LOAD BALANCE IN WASHING MACHINE APPLIANCES

FIELD OF THE INVENTION

The present disclosure relates generally to washing machine appliances, and more particularly to methods for monitoring load balance during operation of washing machine appliances.

BACKGROUND OF THE INVENTION

Washing machine appliances generally include a tub for containing wash fluid, e.g., water and detergent, bleach and/or other wash additives. A basket is rotatably mounted within the tub and defines a wash chamber for receipt of articles for washing. During operation of such washing machine appliances, wash fluid is directed into the tub and onto articles within the wash chamber of the basket. The basket or an agitation element can rotate at various speeds to agitate articles within the wash chamber in the wash fluid, to wring wash fluid from articles within the wash chamber, etc.

One issue with presently known washing machine appliances is the balance of the basket within the tub during operation. This issue is of particular concern for vertical axis washing machine appliances. For example, articles loaded within a basket may not be equally weighted about the central axis of the basket. Accordingly, when the basket rotates, in particular during a spin cycle, the imbalance in clothing weight may cause the basket to be out-of-balance within the tub, such that the central axis of the basket is not parallel with the central axis of the tub and/or basket translates within the tub. Such out-of-balance issues can cause the basket to contact the tub during rotation.

Various methods are known for monitoring load balance of washing machine appliances. However, these methods are complicated, expensive to implement, and/or frequently not accurate. Some methods, for example, monitor increases in speed ripple amplitude or peak accelerations. However, these methods may, for example and depending on the type of device, construction of the appliance, and/or speed of operation, not be sufficiently sensitive to out-of-balance indicators, thus causing inaccurate results.

Accordingly, improved methods and apparatus for monitoring load balance in washing machine appliances are desired. In particular, methods and apparatus which provide simple, cost-effective and accurate monitoring would be advantageous.

BRIEF DESCRIPTION OF THE INVENTION

In accordance with one embodiment of the present disclosure, a method for monitoring load balance in a washing machine appliance is provided. The method includes accelerating rotation of a basket about a central axis within a tub of the washing machine appliance from a first speed to a second speed greater than the first speed. The method further includes detecting a plurality of speed changes during the accelerating step, and summing absolute values of speed differences for each of the plurality of detected speed changes to obtain an unfolded speed value.

In accordance with another embodiment of the present disclosure, a washing machine appliance is provided. The washing machine appliance includes a cabinet, a tub disposed within the cabinet, and a basket disposed within the tub and rotatable relative to the tub about a central axis. The washing machine appliance further includes a motor connected to the basket and operable to rotate the basket, and a controller in communication with the motor. The controller is configured for accelerating rotation of the basket from a first speed to a second speed greater than the first speed. The controller is further configured for detecting a plurality of speed changes during the accelerating step, and summing absolute values of speed differences for each of the plurality of detected speed changes to obtain an unfolded speed value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a washing machine appliance in accordance with one embodiment of the present disclosure;

FIG. 2 provides a front, section view of a washing machine appliance in accordance with one embodiment of the present disclosure;

FIG. 3 provides a graph plotting speed versus time during acceleration of a basket of a washing machine appliance from a first speed to a second greater than the first speed; and FIG. 4 provides a flow chart illustrating a method for monitoring load balance in accordance with one embodiment of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment, a display 61 indicates selected features, a countdown timer, and/or other items of interest to machine users. A lid 62 is mounted to cover 54 and is rotatable between an open position (not shown) facilitating access to a wash tub 64 (FIGS. 2 and 3) located within cabinet 52 and a closed position (shown in FIG. 1) forming an enclosure over tub 64.

Lid 62 in exemplary embodiment includes a transparent panel 63, which may be formed of for example glass, plastic, or any other suitable material. The transparency of the panel 63 allows users to see through the panel 63, and into the tub 64 when the lid 62 is in the closed position. In some embodiments, the panel 63 may itself generally form the lid 62. In other embodiments, the lid 62 may include the panel 63 and a frame 65 surrounding and encasing the panel 63. Alternatively, panel 63 need not be transparent.

FIG. 2 provides a front, cross-section views of washing machine appliance 50. As may be seen in FIG. 2, tub 64 includes a bottom wall 66 and a sidewall 68. A wash drum or wash basket 70 is rotatably mounted within tub 64. In particular, basket 70 is rotatable about a central axis 69, which may when properly balanced and positioned in the embodiment illustrated be a vertical axis. Thus, washing machine appliance is generally referred to as a vertical axis washing machine appliance. Basket 70 defines a wash chamber 73 for receipt of articles for washing and extends, e.g., vertically, between a bottom portion 80 and a top portion 82. Basket 70 includes a plurality of openings or perforations 71 therein to facilitate fluid communication between an interior of basket 70 and tub 64.

A nozzle 72 is configured for flowing a liquid into tub 64. In particular, nozzle 72 may be positioned at or adjacent top portion 82 of basket 70. Nozzle 72 may be in fluid communication with one or more water sources 75, 76 in order to direct liquid (e.g. water) into tub 64 and/or onto articles within chamber 73 of basket 70. Nozzle 72 may further include apertures 79 through which water may be sprayed into the tub 64. Apertures 79 may, for example, be tubes extending from the nozzles 72 as illustrated, or simply holes defined in the nozzles 72 or any other suitable openings through which water may be sprayed. Nozzle 72 may additionally include other openings, holes, etc. (not shown) through which water may be flowed, i.e. sprayed or poured, into the tub 64.

A main valve 74 regulates the flow of liquid through nozzle 72. For example, valve 74 can selectively adjust to a closed position in order to terminate or obstruct the flow of liquid through nozzle 72. The main valve 74 may be in fluid communication with one or more external liquid sources, such as a cold water source 75 and a hot water source 76. The cold water source 75 may, for example, be a commercial water supply, while the hot water source 76 may be, for example, a water heater. Such external water sources 75, 76 may supply water to the appliance 50 through the main valve 74. A cold water conduit 77 and a hot water conduit 78 may supply cold and hot water, respectively, from the sources 75, 76 through valve 74. Valve 74 may further be operable to regulate the flow of hot and cold liquid, and thus the temperature of the resulting liquid flowed into tub 64, such as through the nozzle 72.

An additive dispenser 84 may additionally be provided for directing a wash additive, such as detergent, bleach, liquid fabric softener, etc., into the tub 64. For example, dispenser 84 may be in fluid communication with nozzle 72 such that water flowing through nozzle 72 flows through dispenser 84, mixing with wash additive at a desired time during operation to form a liquid or wash fluid, before being flowed into tub 64. In some embodiments, nozzle 72 is a separate downstream component from dispenser 84. In other embodiments, nozzle 72 and dispenser 84 may be integral, with a portion of dispenser 84 serving as the nozzle 72. A pump assembly 90 (shown schematically in FIG. 2) is located beneath tub 64 and basket 70 for gravity assisted flow to drain tub 64.

An agitation element 92, shown as an impeller in FIG. 2, may be disposed in basket 70 to impart an oscillatory motion to articles and liquid in chamber 73 of basket 70. In various exemplary embodiments, agitation element 92 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 92 is oriented to rotate about vertical axis V. Alternatively, basket 70 may provide such agitating movement, and agitation element 92 is not required. Basket 70 and agitation element 92 are driven by a motor 94. Motor 94 may, for example, be a pancake motor, direct drive brushless motor, induction motor, or other motor suitable for driving basket 70 and agitation element 92. As motor output shaft 98 is rotated, basket 70 and agitation element 92 are operated for rotatable movement within tub 64, e.g., about vertical axis V. Washing machine appliance 50 may also include a brake assembly (not shown) selectively applied or released for respectively maintaining basket 70 in a stationary position within tub 64 or for allowing basket 70 to spin within tub 64.

Various sensors may additionally be included in the washing machine appliance 50. For example, a suitable speed sensor 112 can be connected to the motor 94, such as to the output shaft 98 thereof, to measure speed and indicate operation of the motor 94. Other suitable sensors, such as temperature sensors, pressure sensors, etc., may additionally be provided in the washing machine appliance 50.

Operation of washing machine appliance 50 is controlled by a processing device or controller 100, that is operatively coupled to the input selectors 60 located on washing machine backsplash 56 (shown in FIG. 1) for user manipulation to select washing machine cycles and features. Controller 100 may further be operatively coupled to various other components of appliance 50, such as main valve 74, pump assembly 90, motor 94, speed sensor 112, and other suitable sensors, etc. In response to user manipulation of the input selectors 60, controller 100 may operate the various components of washing machine appliance 50 to execute selected machine cycles and features.

Controller 100 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 may be in communication with controller 100 via one or more signal lines or shared communication busses.

In an illustrative embodiment, a load of laundry articles are loaded into chamber 73 of basket 70, and washing operation is initiated through operator manipulation of control input selectors 60. Tub 64 is filled with liquid, such as water, and may be mixed with detergent to form a wash fluid. Main valve 74 can be opened to initiate a flow of liquid and resulting wash fluid into tub 64 via nozzle 72, and tub 64 can be filled to the appropriate level for the amount of articles being washed. Once tub 64 is properly filled with wash fluid, the contents of the basket 70 are agitated with agitation element 92 or by movement of the basket 70 for cleaning of articles in basket 70. More specifically, agitation element 92 or basket 70 is moved back and forth in an oscillatory motion.

After the agitation phase of the wash cycle is completed, tub 64 is drained, such as through use of pump assembly 90. Laundry articles can then be rinsed by again adding fluid to tub 64. Depending on the particulars of the cleaning cycle selected by a user, agitation element 92 or basket 70 may again provide agitation within basket 70. After a rinse cycle, tub 64 is again drained, such as through use of pump assembly 90. Further, in exemplary embodiments, one or more spin cycles may be performed. In particular, a spin cycle may be applied after the wash cycle(s) and/or after the rinse cycle(s) in order to wring excess wash fluid from the articles being washed. During a spin cycle, basket 70 is rotated at relatively high speeds, as discussed further herein.

While described in the context of specific embodiments of washing machine appliance 50, using the teachings disclosed herein it will be understood that washing machine appliance 50 is provided by way of example only. Other washing machine appliances having different configurations (such as horizontal-axis washing machine appliances), different appearances, and/or different features may also be utilized with the present subject matter as well.

Referring now to FIGS. 3 and 4, various methods may be provided for use with washing machine appliances 50 in accordance with the present disclosure. In general, the various steps of methods as disclosed herein may in exemplary embodiments be performed by the controller 100, which may receive inputs and transmit outputs from various other components of the appliance 50. In particular, the present disclosure is further directed to methods, as indicated by reference number 200, for monitoring load balance in a washing machine appliance 50.

A method 200 may, for example, include the step 210 of accelerating rotation of the basket 70 about the central axis 69 within the tub 64 from a first speed 212 to a second speed 214 which is greater than the first speed 212. For example, controller 100 may operate motor 94 to accelerate rotation of the basket 70.

In exemplary embodiments, step 210 may occur during a spin cycle of the washing machine appliance 50. During a spin cycle, the basket 70 is typically accelerated to a relatively high maximum speed, such as in a range between approximately 800 and approximately 1200 revolutions per minute ("RPMs"). Further, such acceleration typically occurs in two or more steps. For example, the basket 70 may be accelerated from an initial speed, which may be 0 RPMs or a minimum non-zero RPM level such as for example in a range between approximately 60 and approximately 80 RPMs, to a first dwell speed. A dwell speed is a speed between a minimum and maximum speed wherein acceleration is paused for a period of time. The first dwell speed may, for example, be between approximately 105 and 125 RPMs or within another suitable range for a first dwell speed of the basket 70. When the basket 70 reaches the first dwell speed, acceleration may pause for a first dwell time, which may for example be between approximately 15 seconds and approximately 2 minutes or within another suitable dwell time range. After the dwell time, the basket 70 may again be accelerated, either to the maximum speed or to another dwell speed, such as a second dwell speed. Second dwell speed may be greater than first dwell speed, and may for example be between approximately 180 RPMs and approximately 230 RPM's or within another suitable range for a second dwell speed of the basket 70. When the basket 70 reaches the second dwell speed, acceleration may pause for a second dwell time, which may for example be equal to or different from the first dwell time and may for example be between approximately 15 seconds and approximately 2 minutes or within another suitable dwell time range. After the dwell time, the basket 70 may again be accelerated, either to the maximum speed or to another dwell speed, such as a third dwell speed greater than the second dwell speed, and so on until the maximum speed is reached.

In some embodiments, the first speed 212 is zero revolutions per minute, and the basket 70 is thus rotationally stationary. Alternatively, however, the first speed may be greater than 0 revolutions per minute, such that the basket 70 is rotating at the first speed 212. Further, in some embodiments, the second speed 214 is a first dwell speed of the washing machine appliance 50. For example, the second speed 214 may be in the range between approximately 115 and approximately 135 revolutions per minute. Alternatively, however, the second speed may be another suitable speed, any may be a first dwell speed, other dwell speed, or non-dwell speed.

Further, in exemplary embodiments, method 200 may include the step 220 of flowing liquid into the tub 64. For example, controller 100 may operate the main valve 74, as discussed above, to provide such liquid flow. Still further, in exemplary embodiments, method 200 may include the step 230 of draining liquid from the tub 64. For example, controller 100 may operate the pump assembly 90, as discussed above, to perform such drainage. In exemplary embodiments, steps 220 and 230 may occur before step 210. Further, in exemplary embodiments, step 220 may occur before step 230. For example, steps 220 and 230 may occur during a wash cycle or rinse cycle before a spin cycle wherein step 210 occurs. Still further, in exemplary embodiments, step 210 may occur after one or more wash cycles and/or one or more spin cycles.

Method 200 may further include the step 240 of detecting a plurality of speed changes 242 during the accelerating step 210. Notably, in exemplary embodiments, all detected speed changes 242 may be utilized in subsequent steps. As illustrated in FIG. 3, a speed change 242 may be a positive speed change 242' or a negative speed change 242". A positive speed change 242' may occur, for example, due to the acceleration of the basket 70. A negative speed change 242" may occur, for example, due to the basket 70 striking the tub 64 or due to another out-of-balance event during such acceleration. Speed changes 242 may, for example, be detected at a predetermined rate during the accelerating step 210. Such rate may, for example, be empirically determined and may be sufficiently frequent such that an imbalanced load can be detected in accordance with the present disclosure.

In some embodiments, sensors 112 may be utilized to detect speed changes 242. Alternatively, other suitable components or the motor 94, motor shaft 98, controller 100, and/or components thereof may be utilized to detect speed changes 242.

Method 200 may further include, for example, the step 250 of summing absolute values of speed differences 252 for each of the plurality of speed changes 242 to obtain an unfolded speed value 254. In accordance with such step 250, a speed difference may be obtained for each detected speed change 242, whether positive 242' or negative 242" by for example subtracting an initial speed for the speed difference 252 from a final speed for the speed difference 252. Notably, a resulting speed difference 252 may be positive, such as when it is obtained for a positive speed change 242', or may be negative, such as when it is obtained for a negative speed change 242". The absolute value of each speed difference 252 may thus be determined, such that the resulting values for the speed differences 252 are all positive. These values may then be summed to obtain the unfolded speed value 254.

Method 200 may further include, for example, the step 260 of comparing the unfolded speed value 254 to a predetermined threshold speed value 262. In general, a higher unfolded speed value 254 may indicate greater unbalance in a load disposed within basket 70 and/or basket 70 itself, because more speed differences 252 for negative speed changes 242" may be included in the unfolded speed value 254. The predetermined threshold speed value 262 may thus, for example, correspond to a limit beyond which such unbalance is considered unacceptable. The predetermined threshold speed value 262 may, for example, be stored in controller 100. A specific value 262 for appliance 50 may be factory-set when the appliance 50 is manufactured or sold, and/or a user may be able to adjust the value 262 through, for example, selection via input selectors 60.

Method 200 may further include, for example, the step 270 of transmitting one or more output signals 272 when the unfolded speed value 254 is greater than the predetermined threshold speed value 262. The output signal 272 may thus correspond to an unbalanced load. Output signal 272 may, for example, be a signal transmitted to display 61 to indicate to a user that a load may be unbalanced. As a result, display 61 may provide an audio or visual (i.e. via for example a light or text) indicator to the user. Additionally or alternatively, an output signal 272 may be a signal transmitted to another component of appliance 50 to cause some action on the part of that component as a result of the unbalanced load. For example, an output signal 272 may be a signal sent to motor 94 to operate in a manner to agitate the load within the basket 64, or may be a signal sent to motor 94, main valve 74 and/or pump assembly 90 to perform an additional wash cycle or rinse cycle.

Accordingly, the present disclosure provides improved methods and apparatus for monitoring load balance of washing machine appliances 50. Such methods are relatively simple and easy to implement, and are further relatively cost-effective and accurate, as compared to previously known methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring load balance in a washing machine appliance, the method comprising:
    accelerating rotation of a basket about a central axis within a tub of the washing machine appliance from a first speed to a second speed greater than the first speed;
    detecting a plurality of speed changes during the accelerating step;
    summing absolute values of speed differences for each of the plurality of detected speed changes to obtain an unfolded speed value; and
    comparing the unfolded speed value to a predetermined threshold speed value,
    wherein detecting a plurality of speed changes comprises detecting an initial speed and a final speed for each of the plurality of speed changes, and wherein each of the absolute values of speed differences is calculated as the absolute value difference between a corresponding initial value and a corresponding final value.

2. The method of claim 1, further comprising transmitting an output signal when the unfolded speed value is greater than the predetermined threshold speed value, the output signal corresponding to an unbalanced load.

3. The method of claim 1, further comprising flowing liquid into the tub.

4. The method of claim 3, further comprising draining liquid from the tub.

5. The method of claim 4, wherein the flowing step and the draining step occur before the accelerating step.

6. The method of claim 1, wherein the accelerating step occurs during a spin cycle of the washing machine appliance.

7. The method of claim 1, wherein the first speed is 0 revolutions per minute.

8. The method of claim 1, wherein the first speed is in the range between approximately 60 and approximately 80 revolutions per minute.

9. The method of claim 1, wherein the second speed is a first dwell speed of the washing machine appliance.

10. The method of claim 1, wherein the second speed is in the range between approximately 105 and approximately 125 revolutions per minute.

11. A washing machine appliance, the washing machine appliance comprising:
    a cabinet;
    a tub disposed within the cabinet;
    a basket disposed within the tub and rotatable relative to the tub about a central axis;
    a motor connected to the basket and operable to rotate the basket; and
    a controller in communication with the motor, the controller configured for:
        accelerating rotation of the basket from a first speed to a second speed greater than the first speed;
        detecting a plurality of speed changes during the accelerating step;
        summing absolute values of speed differences for each of the plurality of detected speed changes to obtain an unfolded speed value; and
        comparing the unfolded speed value to a predetermined threshold speed value,
        wherein detecting a plurality of speed changes comprises detecting an initial speed and a final speed for each of the plurality of speed changes, and wherein each of the absolute values of speed differences is calculated as the absolute value difference between a corresponding initial value and a corresponding final value.

12. The washing machine appliance of claim 11, wherein the controller is further configured for transmitting an output signal when the unfolded speed value is greater than the predetermined threshold speed value, the output signal corresponding to an unbalanced load.

13. The washing machine appliance of claim 11, wherein the controller is further configured for flowing liquid into the tub.

14. The washing machine appliance of claim 11, wherein the accelerating step occurs during a spin cycle of the washing machine appliance.

15. The washing machine appliance of claim 11, wherein the first speed is 0 revolutions per minute.

16. The washing machine appliance of claim 11, wherein the first speed is in the range between approximately 60 and approximately 80 revolutions per minute.

17. The washing machine appliance of claim 11, wherein the second speed is a first dwell speed of the washing machine appliance.

18. The washing machine appliance of claim 11, wherein the second speed is in the range between approximately 105 and approximately 125 revolutions per minute.

\* \* \* \* \*